United States Patent Office 3,562,907
Patented Feb. 16, 1971

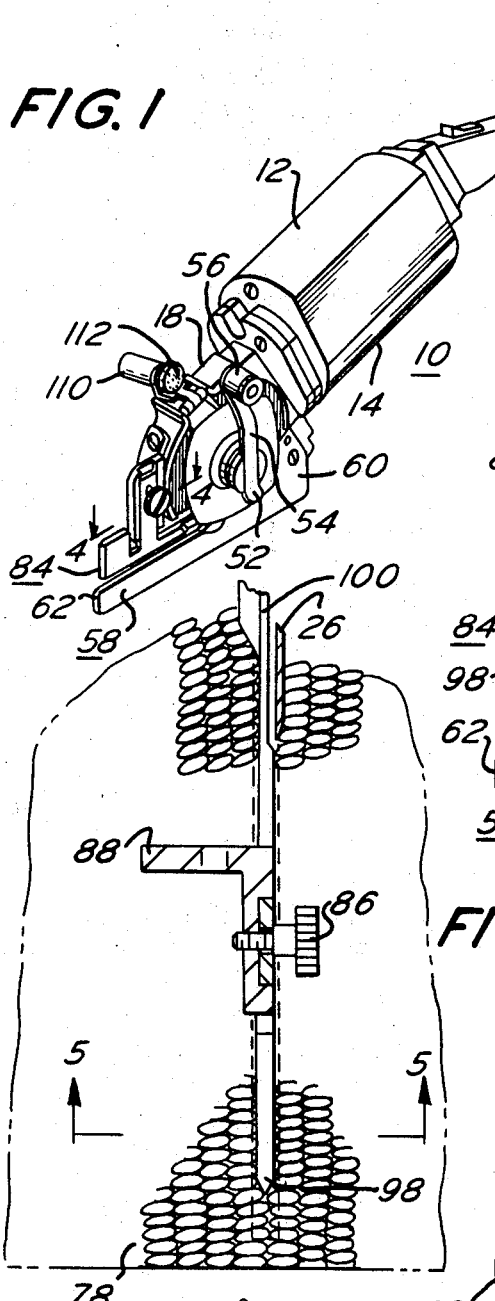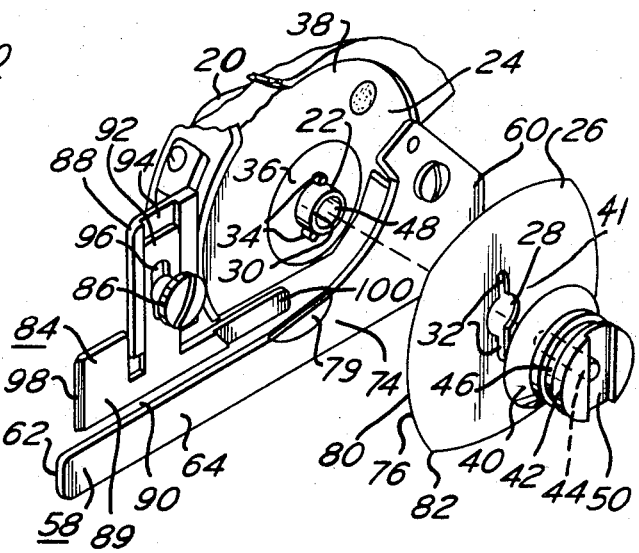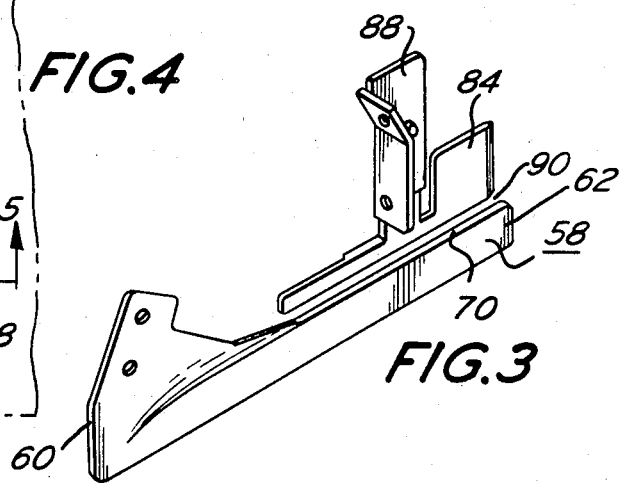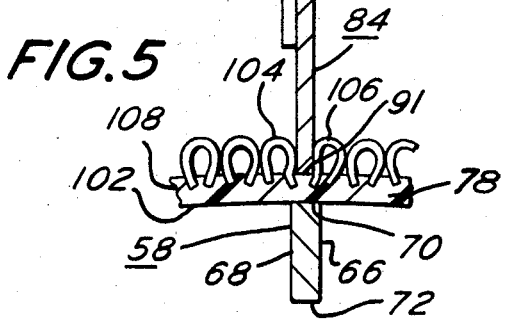

3,562,907
CARPET CUTTING MACHINE
Nathan Greenberg, 5016 Bingham St.,
Philadelphia, Pa. 19120
Filed Apr. 3, 1968, Ser. No. 718,585
Int. Cl. B26b 15/00
U.S. Cl. 30—233                                9 Claims

ABSTRACT OF THE DISCLOSURE

Carpet cutting machine comprising a motor driven rotary cutting blade, a bottom elongated member secured proximate to the cutting blade providing a stationary cutting portion and extending forwardly of the blade, and a guide element adjustably secured over the bottom member for providing a space adapted to receive carpet which is to be cut, the bottom member having narrow top linear edge for engaging the bottom of the backing of the carpeting without binding, while the guide element is of flat thin dimensions for being received between linear rows of loop pile carpeting and adjusted for slidably engaging the top of the carpet backing for guiding the machine therealong and separating the adjacent rows of loops so that same are not cut by the rotary blade of the machine.

---

The invention relates to a carpet cutting machine, particularly to a motorized machine for cutting loop pile carpeting between adjacent linear rows of carpet pile.

Heretofore motorized carpet cutting machines have been available, but such machines have provided a flat base member received under the carpet during the cutting operation. Such machines have been found to be most unsatisfactory for cutting carpeting with cushion or rubber backs due to the tendency of such carpet backings to adhere to the flat bottom plate of the machines. Such prior devices have also been heavy and bulky and therefore not readily portable for use at the place of installation of carpet.

Such motorized carpet cutting machines also have not provided a means by which carpeting of the loop pile type may be accurately cut between adjacent rows of carpet pile without damage to the face yarn. Because of the weight of such prior art cutting machines, their use requires considerable exertion on the part of the operator for manually propelling same along the cutting line during the cutting operation. For bevel cutting of the carpeting, such prior art machines required disassembly of its mechanism and the insertion of a special block for maintaining the cutting means at the bevel angle; special tools have also been required for changing blades and cleaning of such devices.

Therefore, it is a primary object of the invention to provide a new and improved carpet cutting machine which is portable, lightweight and readily cuts carpeting with cushion or rubber backing with a minimum of effort.

Another object of the invention is to provide a new and improved carpet cutting machine which is particularly adapted for cutting loop pile carpeting between adjacent linear rows of carpet pile without cutting or damaging the face yarn.

Another object of the invention is to provide a new and improved carpet cutting machine for accurately and efficiently cutting carpet either in a straight cut or bevel cut without requiring modification of the machine.

Another object of the invention is to provide a new and improved carpet cutting machine in which cushion or rubber backed carpet is cut with the face up for providing a clean even cut.

Another object of the invention is to provide a new and improved carpet cutting machine which may easily be used at the location where carpeting is being installed, requires a minimum of maintenance and in which blades can be changed and the machine cleaned without tools.

The above objects as well as many other objects of the invention are achieved by providing a carpet cutting machine comprising a motor with a housing providing a handle at one end and a rotary shaft at the other end receiving a rotary cutting blade. A bottom elongated member secured with the motor housing proximate to the blade has a portion extending forwardly of the blade and a guide element secured with the motor housing is positionable with respect to the elongated member for providing a space therebetween for receiving carpet which is to be cut. The elongated member has a top linear edge for engaging the bottom of the backing of carpet received within the space, and the guide element has a bottom linear edge parallel to and positioned over the top edge of the elongated member for engaging the top of the backing of the carpet between adjacent linear rows of carpet loops when loop pile carpet is to be cut. The spacing between the elongated member and the guide element is adjusted to the thickness of the carpet backing. The cutting blade is positioned at the end of the space between the elongated member and the guide element.

The elongated member and guide element are relatively flat with the guide element having a thickness allowing it to be slidably received between adjacent rows of loops of loop pile carpet for guiding the machine along and separating adjacent rows of loops for cutting the carpet by the blade between adjacent rows of loops without cutting the loops. The elongated member has a first flat side and provides a stationary blade portion slidably engaging and being overlapped by the side of the rotary blade to provide cutting of the carpet as the carpet is received within the space between the member and element and moves toward the rotating blade.

The rotary blade has an off-round cutting edge providing a scissors-like cutting action between it and the stationary blade portion of the elongated member.

The top edge of the elongated member forward of the cutting blade provides a flat narrow strip surface affording reduced frictional contact with the backing of the carpet being moveably received thereover and has a second side opposite said first side with a flat surface and a portion tapering to an edge proximate to said rotating blade to minimize binding of said carpet as it is cut by gradually separating the cut portions of said carpet.

With the foregoing discussion in mind, this invention will be most readily understood from the following detailed description of a representative embodiment thereof, reference for this purpose being had to the accompanying drawings, in which:

FIG. 1 is a perspective view of a carpet cutting machine embodying invention,

FIG. 2 is an enlarged perspective view similar to FIG. 1 of the guiding and cutting portion of the machine, FIG. 3 is a perspective rear view of the elongated member, guide element and bracket shown in FIG. 2, FIG. 4 is a sectional view taken on the line 4—4 of FIG. 1 indicating the operation of the machine on loop pile carpet outlined by dashed lines, and FIG. 5 is a sectional view taken on line 5—5 of FIG. 4.

Like reference numerals designate like parts throughout the several views.

Referring to the figures, the carpet cutting machine 10, embodying the invention, comprises an electric motor 12 contained in a housing 14 having at one end a handle 16, and at the other end 18 the means for cutting carpet. The end 18 of the housing 14 includes a gear box 20 driven by the motor 12 with an output drive shaft 22 rotating on an axis perpendicular to the rotation axis of the motor armature. The housing 14 at the gear box 20 is provided with a substantially circular recess 24 for accommodating a rotating blade 26. The rotating blade 26 is provided with a central circular opening 28 for being received over the end 30 of the shaft 22. The blade 26 also has a pair of openings 32 extending radially on opposite sides of the central opening 28 for receiving the respective positioning pins 34 which are mounted on plate 36 and rotate with the drive shaft 22 of the gear box 20.

The rotary cutting blade 26 is mounted over the end 30 of the shaft 22 and guide pins 34 against the circular mounting plate 36 which rotates with the blade 26 for providing a clearance for the blade 26 with the back wall 38 of the housing 14 at the gear box 20.

The blade 26 is maintained in position by a retaining ring 40 which engages the outside central region 41 of the blade 26 and rotates with the blade 26, and a stationary cap 42 which has a pin 44 engaging the inside race of a ball bearing 46 and extends through the central opening 28 of the blade 26 into the opening 48 of the end 30 of the shaft 22 of the gear box 20. The outside race of the ball bearing 46 engages the inside of ring 40 for allowing the ring 40 to move freely with the blade 26. The top surface of the cap 42 is provided with a channel or groove 50 which receives therein the end 52 of a leaf spring means 54 having its other end retained by screw means 56 with the housing 14 at the gear box 20. When the machine 10 is assembled as shown in FIG. 1, the spring means 54 prevents rotation of the cap 42 and exerts a force on the rotary blade 26 urging it towards the mounting plate 36 of the gear box 20.

The spring means 54 may readily be removed from the slot or groove 50 of the cap 42 for removing or changing the blade 26 and cleaning the machine 10 without use of tools.

A lower elongated member 58 is attached at one end 60 with the housing 14 at the gear box 20 and extends forwardly to its free end 62. The forwardly extending portion 64 of the member 58 has relatively flat vertically oriented side walls 66, 68 and narrow strip top and bottom surfaces 70 and 72 (see FIG. 5). The intermediate portion 74 of the elongated member 58 has its side 66 positioned in contact with the inner or back surface 76 of the rotary blade 26. The portion 74 thus provides a stationary blade for coacting with the rotary blade 26 for cutting the carpet, such as the loop pile carpet 78 illustrated in connection with FIG. 4. A hard metallic segment 79 is preferably provided at the portion 74 for slidably engaging the back surface 74 of the blade 26 and providing the coacting cutting means. In this regard, it is noted that the rotary blade 26 has a non-circular peripheral cutting edge 80 with regions 82 which radially extend to a greater degree than other portions of the periphery 80 providing the effect of a scissors cutting action when the blade 26 rotates proximate to the stationary blade region 74 of the elongated member 58. It is noted that the spring 54 acts to urge the blade 26 against the region 74 of the member 58 to provide efficient cutting action.

A guide element 84 is slidably secured by screw means 86 to a bracket 88 attached to the housing 14 at the gear box 20. The guide element 84 which has a bottom portion 89 with a bottom surface 91 extending above and spaced parallel with the top surface 70 of the bottom member 58 may have the space 90 between the member 58 and element 84 adjusted by the vertical positioning of the guide element 84. This is accomplished by loosening the screw means 86 which then allows the vertical portion 92 of the element 84 to be slidably moved within the channel 94 of the bracket 88. The elongated opening 96 in the portion 92 of the element 84 allows the relative positioning of the element 84 within limits. The space 90 between the member 58 and element 84 may be fixed by tightening the screw means 86 for preventing relative motion between the guide element 84 and the bracket 88. The forward end of the guide element 84 is provided with a pointed front edge 98 while the rearward extending portion 100 of the guide element 84 is provided with a cutaway region for clearing the rotating blade 26.

In operation of the carpet cutting machine, the guide element 84 is positioned to provide a space 90 between it and the elongated member 58 for receiving therein the carpet which is to be cut. Since the top surface 70 of the member 58 provides a minimum surface for contacting the bottom surface 102 of the carpeting 78, a minimum frictional resistance will be developed by movement of the carpet 78 towards the cutting blade 26. Thus the carpet cutting machine 10 may be utilized with cushion back and rubber back carpet for cutting same with the face of the carpet positioned upward, whereas prior art cutting machines having a flat bottom plate cannot be so used because of the adhesion of the rubber back to the bottom plate. Since the machine 10 is also of lightweight construction, it is readily portable and easily manipulated when moving same along a line on which the carpet is to be cut. This not only results in more accurate cutting, but increases the utility of the machine 10, since the machine may be used on the job at the place where the carpet is being fitted and laid.

The carpet cutting machine 10 is of particular utility in connection with the cutting of loop pile carpet such as shown at 78 in FIGS. 4 and 5, having linearly aligned loops, for cutting the carpet between adjacent loops 104, 106 without cutting the loops or face yarn of the carpet. When thus used, the guide element 84 is positioned so that it is spaced from the bottom elongated member 58 to provide a space 90 for slidably receiving therebetween the backing 108 of the carpet 78 as clearly shown in FIG. 5. In this case the guide element 84 is received between adjacent rows of loops 104, 106 and as the machine 10 is moved therealong the pointed front portion 98 of the guide element 84 acts to separate the adjacent loops 104, 106 while guiding machine 10 so that the rotating blade 26 cuts the backing 108 of the carpet 78 in the region between the selected rows of loops 104, 106. The construction of the machine 10 with its guide element 84 and elongated member 58 positioned to provide the minimum frictional contacting surfaces allows the machine 10 to be readily slid along the carpet between said rows efficiently, effectively, and cleanly cutting the carpet in the desired manner.

It is noted that when carpeting of any type is to be bevel cut, the portable nature of the machine allows it to be tilted to one side and moved along a chalk line for severing the carpet along the desired bevel angle. No change in the internal structure of the machine is thus required. The ease of thus moving the machine to the desired angular position is noted from the structure of the bottom elongated member 58 which presents a narrow bottom surface 72 acting as a pivot for the angular orientation of the device 10 to accomplish the bevel cut.

The machine 10 may also be provided with a pivoted unit 110 having a grinding stone 112 for engagement with the cutting edge of the rotary blade 26 at its outside surface for sharpening the blade 26 without removing same from its mounting in the machine 10, thereby minimizing the maintenance and the requirement for changing of the blade 26.

Although the carpet cutting machine has been described in connection with an electric motor, it will be noted that the device may operate with other motive force such as by the use of a pneumatic motor means.

It will be obvious to those skilled in the art that the invention may find wide application with appropriate modification to meet the individual design circumstances, but without substantial departure from the essence of the invention.

What is claimed is:
1. A carpet cutting machine comprising a rotary cutting blade, means for supporting and rotating said blade, a bottom elongated member secured with said means proximate to said blade having a portion extending forwardly of said blade and having a narrow linear edge for slidably engaging the bottom surface of the backing of loop pile carpet to be cut, and a positionable guide element secured with said means having a linear edge adjustably fixed with respect to the linear edge of said member for providing a space therebetween for slidably engaging and receiving the backing of carpet which is to be cut while said element is received between adjacent rows of loops of said carpet, whereby said carpet is positioned with respect to the machine and the machine is guided by said guide element so that the carpet is received between the respective adjustable spaced edges of said member and element for cutting said backing between rows of loops without cutting said loops, said guide element being adjustably secured with said means to allow its positioning for adjusting the space between its said adjustable edge and the linear edge of said member while maintaining said edges parallel to each other.

2. The machine of claim 1 in which said member has a top linear edge for engaging the bottom of the backing of loop pile carpet received within said space, and said guide element has a bottom linear edge parallel to and positioned over the top edge of said member for engaging the top of the backing of said carpet between adjacent linear rows of carpet loops with the spacing of said member and element adjusted for the thickness of said carpet backing, said cutting blade being positioned at the end of the space between said member and element for cutting said carpet linearly between slected adjacent rows of carpet loops.

3. The machine of claim 2 in which said member and guide element are relatively flat, said guide element having a thickness provided for being slidably received between adjacent rows of loops of said loop pile carpet for guiding said machine along and separating adjacent rows of loops for cutting said carpet by said blade between adjacent rows of loops without cutting said loops, said member having a first flat side and providing a stationary blade portion slidably engaging and being overlapped by the side of said rotary blade to provide cutting of said carpet as said carpet is received within the space between the member and guide element and moves toward said rotating blade.

4. The machine of claim 3 in which said rotary blade has an off-round cutting edge providing a scissors-like cutting action between it and the stationary blade portion of said member.

5. The machine of claim 3 in which said guide element is slidably mounted with said means for adjusting the spacing between its bottom edge and the top edge of said member and has screw clamping means for fixing its position with said means.

6. The machine of claim 3 in which the top edge of said member forward of said cutting blade provides a flat narrow strip surface affording reduced frictional contact with the backing of said carpet being movably received therover and has a second side opposite said first side with a flat surface and a portion tapering to an edge proximate to said rotating blade to minimize binding of said carpet as it is cut by gradually separating the cut portions of said carpet.

7. The machine of claim 6 in which said means has a spring for urging the overlapping side of said cutting blade against the flat stationary blade portion of said member for cutting carpet received therebetween, said stationary blade portion being made of a hardened wear resistant material.

8. The machine of claim 7 in which said means comprises a motor with an outer housing providing a handle means for said machine at one end and a drive shaft for removably receiving and rotating said cutting blade and supporting said member and element proximate thereto at the other end.

9. The machine of claim 8 in which said motor is an electric motor.

References Cited
UNITED STATES PATENTS

| | | | |
|---|---|---|---|
| 1,125,434 | 1/1915 | Arendt | 30—264X |
| 1,130,369 | 3/1915 | Bortman | 30—264 |
| 1,796,463 | 3/1931 | Kaltenbach | 30—240 |
| 1,821,716 | 9/1931 | Kusiv | 30—276 |
| 2,608,757 | 9/1952 | Joseph | 30—276 |
| 3,009,247 | 11/1961 | Mueller | 30—294 |
| 3,262,201 | 7/1966 | Docken | 30—240 |

FOREIGN PATENTS

| | | | |
|---|---|---|---|
| 729,089 | 4/1932 | France | 30—273 |

ROBERT C. RIORDON, Primary Examiner

J. C. PETERS, Assistant Examiner

U.S. Cl. X.R.

30—240